THE EFFECT ON NEO ACID YIELD OF VARIATION OF $H_2SO_4$/HCOOH/OLEFIN RATIOS

United States Patent Office 3,515,737
Patented June 2, 1970

3,515,737
PRODUCTION OF ORGANIC ACIDS
Bertram Yeomans, Hessle, England, assignor to The Distillers Company Limited, Edinburgh, Scotland, a British company
Continuation-in-part of application Ser. No. 556,516, June 9, 1966. This application Sept. 20, 1968, Ser. No. 761,181
Claims priority, application Great Britain, July 22, 1965, 31,173/65
Int. Cl. C07c 5/00, 53/00
U.S. Cl. 260—413
7 Claims

ABSTRACT OF THE DISCLOSURE

The process for the preparation of neo-carboxylic acids from olefins by reaction with formic acid and sulfuric acid, followed by addition of water, is improved by using a molar ratio of olefin:formic acid:sulfuric acid, in the range of between 1:1:2 and 1:4:12 and by the use of a small amount of water in the last step, that is, between 3 and 25% of the weight of the sulfuric acid present in the reaction mixture containing water. The acids are easily isolated from the organic phase. The sulfuric acid may be recycled after addition of sulfur trioxide and the process may be operated continuously.

Figure 1:
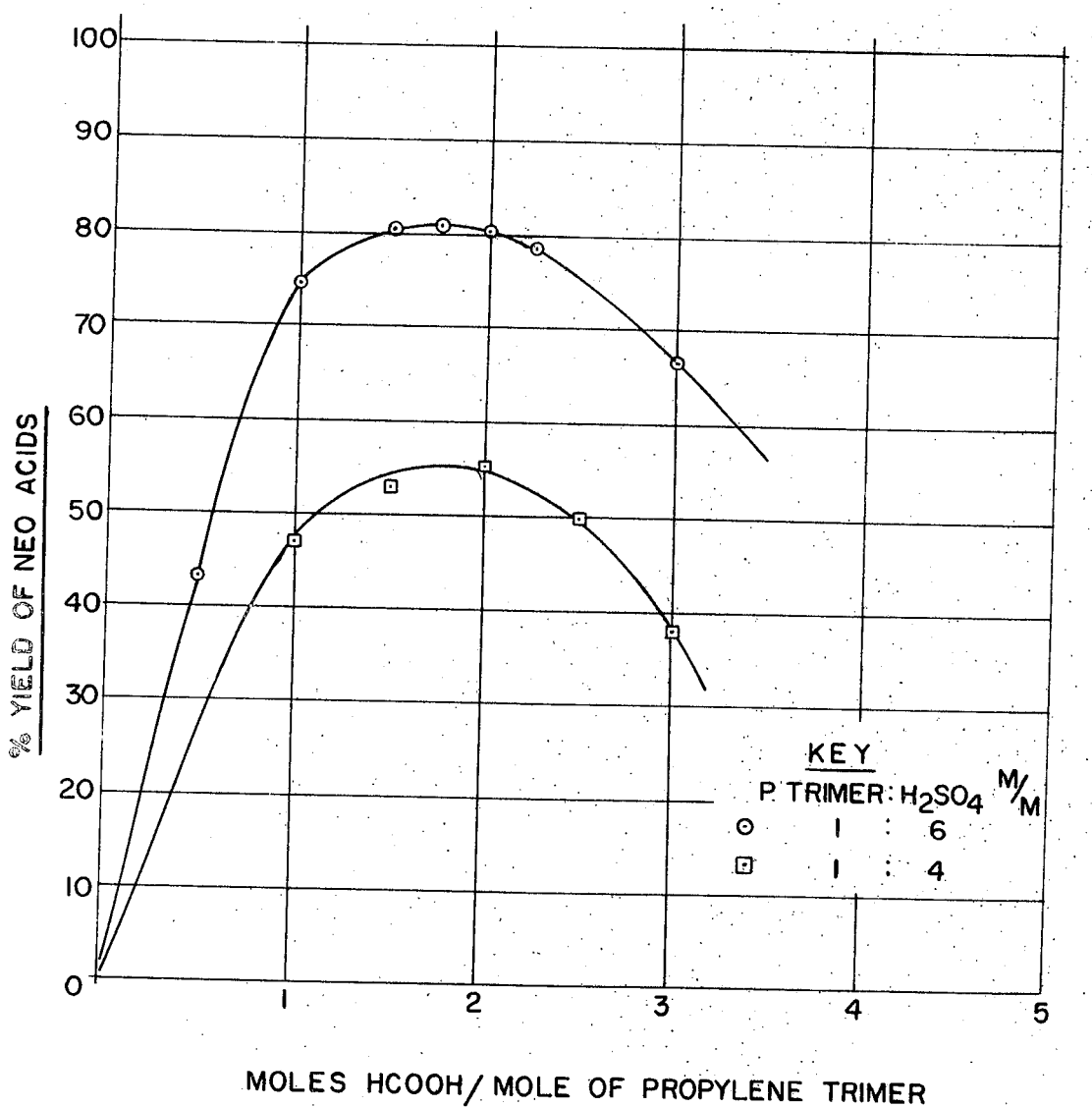

The present invention relates to the preparation of neo-acids and in particular to the preparation of such acids by reacting formic acid with olefins in the presence of sulphuric acid as catalyst and is a continuation in part of application Ser. No. 556,516 filed on June 9, 1966 and now abandoned.

It is known to produce neo-acids by reacting olefins and carbon monoxide using sulphuric acid as catalyst. However, such processes have hitherto been of little commercial value, because the subsequent recovery of the neo-acids is difficult. In order to achieve phase separation of the neo-acids, it has always been accepted in the art that following the reaction, the solution of products and catalyst must be strongly diluted with water. Such dilution, normally with an equal weight of water, leads to the necessity to reconcentrate the sulphuric acid catalyst in order that it may be re-used. Such reconcentration is costly and uneconomic and as a consequence investigators of late have turned their attention to alternative catalysts.

The present invention is based on the surprising discovery that, quite contrary to the understanding of the prior art with respect to carbon monoxide, phase separation of the neo-acids produced following reaction of formic acid with olefins in the presence of sulphuric acid as catalyst is readily achieved in the presence of only small amounts of water.

Accordingly, the present invention provides a process for the production of neo-acids which comprises reacting formic acid with an acyclic or alicyclic olefin containing more than three carbon atoms, in the presence of sulphuric acid, thereafter allowing an organic phase to separate from the sulphuric acid solution by adding a small amount of water and recovering the neo-acid therefrom as organic phase.

By "neo-acid" is meant throughout this specification a tertiary aliphatic carboxylic acid where the α-carbon atom is attached directly to four further carbon atoms, i.e., the the α-carbon atom is a quaternary carbon atom.

It is particularly preferred to use acyclic olefins. The olefin is preferably a mono-unsaturated compound having a branched carbon skeleton, such as types 1, 2 and 3:

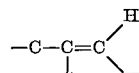 (1)

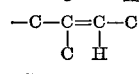 (2)

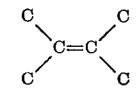 (3)

Where the olefin contains the group

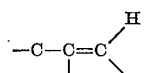 (4)

or

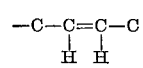 (5)

the molecule should also contain a group having a carbon skeleton

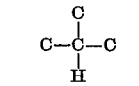 (6)

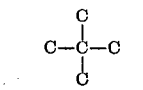 (7)

or

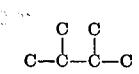 (8)

In any event it is preferred that the olefin should contain one or more of these carbon skeletons 6, 7 and 8. The olefin preferably contains any number of carbon atoms from 5 upwards, but olefins having from 8 to 20 carbon atoms in the molecule are particularly preferred.

In place of the olefin there may be used other compounds containing from 5 to 20 carbon atoms, for example tertiary halides, alcohols such as a primary, secondary or tertiary octanol, tertiary mercaptans such as 2,2-dimethylpentyl mercaptans and mixture of an isoparaffin such as isoheptane and an isoparaffin such as isobutene. These compounds will react with formic acid in the presence of concentrated sulphuric acid as though they are true olefins.

The olefin may be added to the reaction mixture in solution, for example in cyclohexane or an aliphatic chlorocarbon solvent. It is preferred to use a solvent which does not contain hydrogen atoms, for example carbon tetrachloride or tetrachloroethylene, although the use of solvents which do contain hydrogen atoms is within the scope of the invention.

The effect of various solvents on the yield are shown in Table 1 to clearly demonstrate the superiority of the aliphatic chlorocarbon solvent.

TABLE 1

| Run No.: | Reagent Molar Ratios | | | Reaction | | Olefin solvent used | Percent Yield of neo-acids |
| --- | --- | --- | --- | --- | --- | --- | --- |
| | Olefin | HCOOH | H₂SO₄ | Temp. °C., | Duration, hours | | |
| 1 | 1 | 2 | 4 | 0°→19° | 2.5 | 2 m. Diethyl ether | 12 |
| 2 | 1 | 2 | 4 | −2°→ 5° | 2.5 | 1 m. cyclohexane | 43.1 |
| 3 | 1 | 2 | 4 | 0°→10° | 2.5 | 1 m. ethylene dichloride | 44.8 |
| 4 | 1 | 2 | 4 | −1°→11° | 2.5 | 1 m. carbon tetrachloride | 60.9 |
| 5 | 1 | 2 | 4 | −3°→10° | 2.3 | 1 m. tetrachloro ethylene | 60.4 |
| 6 | 1 | 2 | 6 | 2°→11° | 2.2 | 1 m. AcOH | 59.5 |
| 7 | 1 | 2 | 6 | 0°→12° | 2.2 | 2 m. AcOH | 31.5 |

Figure 2:
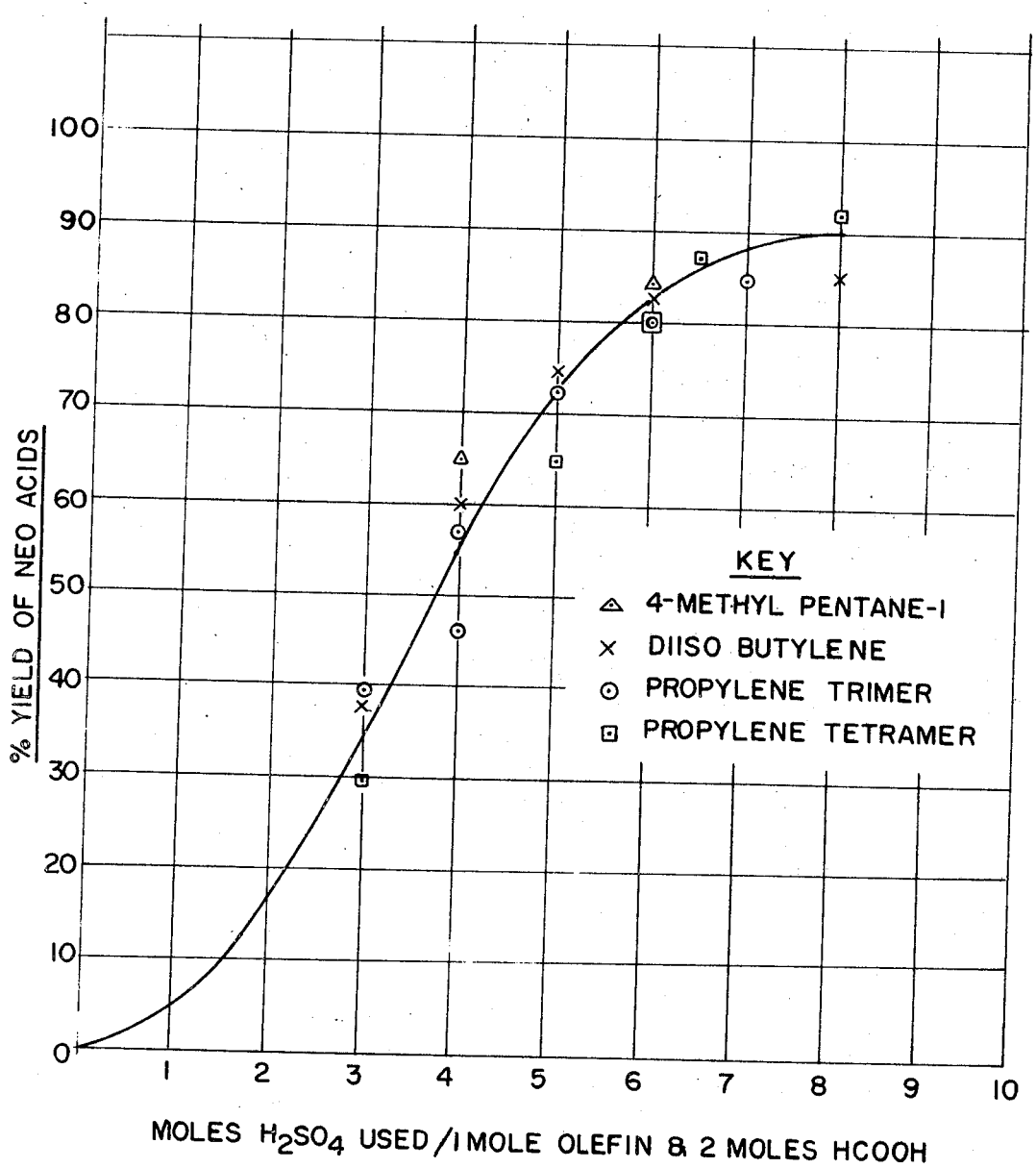

The molar ratio of olefin:formic acid:sulphuric acid may vary widely, but it is preferred to operate in the molar range 1:1:2 to 1:4:12, preferably in the range 1:1.5:6 to 1:2:7. The most particularly preferred range is 1:2:6 as it results in the highest yield of neo-acids and most economical process. This is illustrated in the accompanying graphs. FIG. 1 shows the effect on yield of neo-acid of varying the number of moles of formic acid to olefin at two fixed ratios of olefin to sulphuric acid, using propylene trimer. In each case a maximum occurs when the molar ratio of olefin to formic acid is approximately 1:2. The highest yield occurs when the ratio of olefin to sulphuric acid is 1:6. The effect of variation of the sulphuric acid:olefin ratio is also shown in FIG. 2. When using 4-methyl pentene-1 di-isobutylene, propylene trimer and propylene tetramer it is found that as the sulphuric acid:olefin ratio is increased up to 1:6 the yield increases markedly, but when the ratio is greater than 1:7 any further increase has only a very small effect on yield. It is preferred to re-use the concentrated sulphuric acid after the separation of neo-acids and refortification have taken place. The greater the amount of acid used, the greater the amount of water which must be added to separate the neo-acids and hence the greater the amount of sulphur trioxide required for refortification. As this would increase the catalyst cost it is preferred not to use more than 7 moles of sulphuric acid per mole of olefin.

The concentration of sulphuric acid present during reaction lies within the range 95% to 120% w./w., based on free sulphur trioxide equivalent, preferably 96% to 100%.

The reaction temperature may lie within a wide range, for example −20° C. to +30° C., but is preferably in the range 0° C. to +20° C. Similarly, reaction periods may vary within wide limits, but may be between 0.5 and 6 hours, preferably 1 to 6 hours. Periods of 1.5 to 3.5 hours are particularly preferred.

In the preferred process, the formic acid is added to the sulphuric acid catalyst at about 0° C. to −20° C. A small amount of the olefin may be also added during this step in order to help stabilise the formic acid. The remainder of the olefin is then added at a temperature between 0° C. to +20° C., and after completion of the reaction, phase separation is obtained. It is necessary to add a small amount of water at this stage to assist phase separation. The amount of water should not exceed 25% w./w. based on the sulphuric acid present in the mixture of the water. It is preferred to add more than about 3% of water, the particularly preferred range being between 5 and 15% w./w. It is critical to add only the minimum amount of water necessary to achieve phase separation in order to avoid expensive reconcentration of sulphuric acid. It has also been found that addition of more formic acid facilitates separation. It is preferred to add one mole of formic acid per mole of olefin used in the reaction stage. When operating with the preferred ratio of olefin to formic acid of 1:2, one mole of formic acid is used up in the reaction stage and one remains in solution in the sulphuric acid. Addition of one more of formic acid assists in the separation of the neo-acid and restores the concentration of formic acid in the sulphuric acid to the optimum value. Use of appreciably more than one mole of formic acid per mole of olefin used in the reaction stage will result in too high a concentration in the sulphuric acid and reduced yields of neo-acids, as explained above and illustrated in FIG. 1. Consequently the amount added should not exceed 3 moles, and is preferably less than 2 moles and most preferably is 1 mole.

The separated organic phase is decanted and the catalyst raffinate is extracted with a suitable solvent, for example cyclohexane or an aliphatic chlorocarbon solvent such as carbon tetrachloride or tetrachloroethylene.

As the sulphuric acid is diluted to only a minor extent to achieve phase separation, the recovered sulphuric acid solution may readily be refortified with sulphur trioxide and recycled to the reaction stage. The sulphur trioxide used to refortify the recovered sulphuric acid may be added in solution, preferably in a solvent which does not contain hydrogen atoms. An aliphatic chlorocarbon solvent such as carbon tetrachloride or preferably tetrachloroethylene, or alternatively liquid sulphur dioxide may be used. The refortification is carried out at a temperature in the range 0° C. to −30° C., preferably between −15° C. and −20° C. The comparatively small surplus of acid made during refortification may be separated from the recycle stream for use in subsequent neo-acid purification procedures, for example, regeneration of the neo-acids from their aqueous solutions in sodium or potassium hydroxide. When the preferred molar ratio of reactants is used, approximately 20% of the refortified acid is so used, and little or no surplus sulphuric acid has to be disposed of.

Any sulphonic acid produced in the process may be separated from the neo-acid product by trituration with water.

By recycling the sulphuric acid to the reaction stage there is the further advantage that the bulk of any neo-acids which may be left in the sulphuric acid phase are not lost to the process.

The invention will be further understood by reference to the following examples:

EXAMPLE 1

Formic acid (2 moles) was added to 99% w./w. sulphuric acid (3.88 moles) at −10° C. with stirring, over a period of 25 minutes. During this period about 10% of a mixture of propylene trimer (1 mole) and cyclohexane (0.93 mole) was also added and the remaining 90% was added over a further 135 minutes at +10° C. The mixture was stirred for a further 10 minutes and then aliquots (50 ml.) were withdrawn and mixed with water. The ease of phase separation obtained is illustrated in Table 2.

TABLE 2

| Percent w./w. water added based on sulphuric acid present | 58.0 | 11.6 | 8.3 | 6.0 | 2.9 |
| --- | --- | --- | --- | --- | --- |
| Volume (ml.) of organic phase separated in 'x' minutes | 'x' | | | | |
| Do | 1 | ¹26 | 26 | 26 | 6 | 3 |
| Do | 5 | 26 | 26 | 26 | 18 | 11 |
| Do | 13 | 26 | 26 | 26 | 26 | 12 |
| Do | 34 | 26 | 26 | 26 | 26 | 21 |
| Do | 64 | 26 | 26 | 26 | 26 | 21 |
| Do | 124 | 26 | 26 | 26 | 26 | 24 |

¹ 26 ml.=theoretical volume of organics present in the 50 ml. sample of reaction product.

The results indicate that additions as small as 6% w./w. of water to the sulphuric acid present in the reaction product, are sufficient to give adequate and speedy phase separation.

EXAMPLE 2

Formic acid (2 moles) was added over a period of 25 minutes to 99% w./w. sulphuric acid (3.88 moles) at −10° C. with stirring. During the period about 7% of a mixture of propylene trimer (1 mole) and cyclohexane (0.93 mole) was added and the remaining 93% was added over 130 minutes at +5° C. The product was stirred for a further 10 minutes and then treated with water (1 mole) added over 20 minutes as a fine spray at about 0° C. The product was separated and extracted with cyclohexane (3× 150 ml.). The organic extracts were bulked and neo decanoic acids were separated from neutral reaction products by extraction with aqueous 12% w./v. potassium hydroxide (3× 200 ml.). The caustic extracts were acidified with mineral acid, extracted with cyclohexane (3× 150 ml.), dried and concentrated free of solvent, yielding a distillation residue (110.3 g.) which contained 0.57 mole of neo decanoic acids.

A repeat experiment was carried out exactly as described above except that the water treatment step comprised adding the reaction product to ice (500 g.) and the neo decanoic acids were then isolated as above, as a distillation residue (104.1 g.) which contained 0.44 mole of neo decanoic acids.

These experiments demonstrate that neo-acids may be separated without loss of yield, by the addition of a small quantity of water to the reaction mixtures.

EXAMPLE 3

Formic acid (2 moles) was added over a period of 20 minutes to 99% w./w. sulphuric acid (3.88 moles) at −10° C. together with a 10% aliquot of a mixture of propylene trimer (1 mole) and cyclohexane (0.93 mole). The remaining 90% was added over 95 minutes at +5° C. Water (35 g.) was added over 1 hour at −3° C. and, after stirring for a further 15 minutes, the regenerated product phase was separated and the neo decanoic acids (0.56 mole) were isolated as described above in Example 2.

EXAMPLE 4

Formic acid (2 moles) was added over a period of 120 minutes to 99% w./w. sulphuric acid (3.88 moles) at −10° C. together with a 13% aliquot of a mixture of diisobutylene (1 mole) and cyclohexane (0.93 mole). The remaining 87% of the olefin was added over 100 minutes at +50° C. The mixture was stirred for a further 15 minutes, and water (18 g.) was then added over a period of 15 minutes. The mixture was stirred for a further 15 minutes and after standing for a short period the product was separated and the neo-acids were isolated as a distillation residue (0.46 mole) by the procedure described in Example 2.

A repeat experiment was carried out exactly as described above except that the water treatment step comprised the addition of the reaction product to ice (500 g.). The amount of neo-acids isolated was 0.41 mole.

EXAMPLE 5

Formic acid (2 moles) was added over a period of 15 minutes to 99% w./w. sulphuric acid (3.88 moles) at −12° C., together with a 9% aliquot of a mixture of propylene tetramer (1 mole) and cyclohexane (0.93 mole). The remaining 91% of the olefin was added over 105 minutes at +10° C. The mixture was stirred for 135 minutes and water (20 g.) was added at +2° C. over a period of 20 minutes. The organic product separated as a distinct phase from the sulphuric acid and the neo tridecanoic acids were isolated as a distillation residue (0.52 mole) by the procedure described in Example 2.

A repeat experiment with a water treatment step comprising the addition of the reaction product to ice (500 g.), gave a similar yield of tridecanoic acids (0.49 mole).

EXAMPLE 6

Formic acid (2 moles) was added over a period of 125 minutes to a 1.5 l. stirred reactor, fitted with a cooling coil and containing 97.5% w./w. sulphuric acid (6.5 moles). The reactor contents were kept at a temperature just above the freezing point of the reactant mixture initially at −1° C. and then as soon as was practical at −20° C. When the formic acid addition was complete the temperature of the reactor contents was raised swiftly over a period of 5 minutes to +7° C. and propylene trimer (1 mole) diluted in tetrachloroethylene (1 mole) was added over 95 minutes allowing the temperature to rise gradually to +13° C. by the end of the addition.

The reactor contents were then cooled swiftly to 0° C. and then water (1.2 moles) and formic acid (1 mole) was added over a period of 25 minutes while the temperature rose to ca. +5° C. After 20 minutes the emulsified product separated as an upper phase and this was decanted into a receiver. The catalyst raffinate was extracted with tetrachloroethylene (3× 150 moles) and the separated organic extracts were bulked. An aliquot of catalyst raffinate (120 g.) was removed from the reactor for use in the neo-acid purification stage.

The bulked tetrachloroethylene extracts were extracted with aqueous 12% w./w. sodium hydroxide (2× 250 ml.), back extracted with tetrachloroethylene (150 ml.) and regenerated with sulphuric acid. The regenerated neo-decanoic acids were extracted with tetrachloroethylene (3× 150 ml.) and the organic extracts were triturated with water (30 ml.), brine (3× 30 ml.) and finally more water (30 ml.) to separate residual hydroxysulphonic acids.

Neo-decanoic acids (0.76 mole) were isolated from the tetrachloroethylene extracts by flash evaporation of the solvent followed by a topping and tailing vacuum distillation through a 10-plate Oldershaw column. 90% of the neo-acids charged to the distillation system were recovered as a distillate B.P. 132–8° C./10 mm., acid number 324.

The residual catalyst raffinate was cooled strongly to −20° C. and sulphur trioxide (1.15 moles) together with tetrachloroethylene (1 mole) were added at −15° C. to −20° C. over a period of 120 minutes. The sulphur trioxide and tetrachloroethylene were fed separately into a limb fitted with a weir designed to give a short mixing time, and a spike designed to disperse the overflowing mixture into minute droplets prior to entry into the reactor. When the sulphur trioxide addition was complete, formic acid (0.32 mole) was added over a period of 10 minutes and then the reactant mixture temperature was rapidly raised to about +7° C. Propylene trimer (1 mole) mixed with tetrachloroethylene (1 mole) was then added over a period of 90 minutes while the reaction temperature was allowed to rise eventually to +16° C. The reactor product was then dropped into ice (600 g.) and the organic products were isolated by partition with tetrachloroethylene (3× 150 ml.). Neo-decanoic acids (0.803 mole) were isolated by caustic extraction, regeneration, partition with tetrachloroethylene, trituration and distillation as described above. The addition of water (1.2 moles) and make-up formic acid (1 mole) for continuous operation as in the first process stage would have given a 95% recovery of the neo-acids made and this would have corresponded to a yield of 0.763 mole of neo-decanoic acids. Analyses showed that the neo-decanoic acids products contained 4% of $C_{19}$ "dimer" acids and about 1.5% of $C_{5-7}$ acids.

EXAMPLE 7

A variety of experimental results based on the use of propylene trimer and tetramer as the olefin component are given in Tables 3 and 4 below. The experimental procedure employed was substantially the same as that detailed in Example 6 and covered two preparation sequences by the following stages; reaction (A), separation, refortification, reaction (B) (with recycled catalyst) and separation.

EXAMPLE 9

Tables 6 and 7 give data illustrating the improved yield of neo-acid obtained from propylene trimer when the ratio of reactants is the preferred one of 1:2:6.5 and when the efficiency of the separation stage is improved by operating with a slightly diluted catalyst and by the addition of make-up formic acid.

TABLE 3

| | Percent w./w. $H_2SO_4$ used— | | Molar ratio of reagents used— | | | | | | | Separation stage moles used— | | Reaction | | | |
|---|---|---|---|---|---|---|---|---|---|---|---|---|---|---|---|
| | | | Olefin | | HCOOH | | $H_2SO_4$ | | $SO_3$ | | | Temp., °C. | | Duration, hours | |
| | A | B | A | B | A | B | A | B | B | $H_2O$ | HCOOH | A | B | A | B |
| | | | P. Trimer | | | | | | | | | | | | |
| Run No.: | | | | | | | | | | | | | | | |
| 1 | 98.55 | 98.1 | 1 | 1 | 2 | 2 | 6 | 6 | 1 | 1.2 | 1 | +10 | +15 | 1.75 | 1.75 |
| 2 | 97.45 | 97.5 | 1 | 1 | 2 | 2 | 7 | 6.9 | 1.1 | 1.2 | 1.3 | +8 | +14 | 1.75 | 1.35 |
| 3 | 97.5 | 97.5 | 1 | 1 | 2 | 2.1 | 6.5 | 6.8 | 1.15 | 1.2 | 1 | +10 | +13 | 1.6 | 1.5 |
| | | | P. Tetramer | | | | | | | | | | | | |
| 4 | 98.3 | 99.0 | 1 | 1 | 2 | 2.1 | 6.5 | 6.5 | 1.3 | 1.2 | 0.8 | +7 | +10 | 1.7 | 1.5 |
| 5 | 98.4 | 99.4 | 1 | 1 | 2 | 2.1 | 6.5 | 6.5 | 1.3 | 1.2 | 0.8 | +6 | +7 | 1.75 | 1.8 |

TABLE 6

| | Reagents Molar Ratios used— | | | Percent w./w. $H_2SO_4$ used | Catalyst water content, mole | Molar additions at separation stage | |
|---|---|---|---|---|---|---|---|
| | Propylene trimer | HCOOH | $H_2SO_4$ | | | Water | Formic acid |
| Run No.: | | | | | | | |
| 1 | 1 | 2 | 4 | 100 | 0 | 1.15 | 0 |
| 2 | 1 | 2 | 6.5 | 97.5 | 0.88 | 1.20 | 1.0 |

TABLE 7

| | Raffinate | | Water contents, mole | | | Molar conv. of trimer to neo-decanoic acid | Percent recovery of neo-acids at separation stage | Molar recovery of neo-decanoic acid |
|---|---|---|---|---|---|---|---|---|
| | $H_2SO_4$* amount, mole | Purge $H_2O$ content, mole | Recycle $H_2SO_4$ | Initial catalyst content | $SO_3$ required to reconcentrate | | | |
| Run No.: | | | | | | | | |
| 1 | 1 | 0.29 | 1.01 | 0 | 1.01 | 0.567 | 94.5 | 0.536 |
| 2 | 1 | 0.34 | 1.89 | 0.88 | 1.01 | 0.80 | 95 | 0.76 |

*The acid purge is used in the neo-acid purification stage for the regeneration of the sodium salts.

The invention is further illustrated by the accompanying graphs.

Figure 3:
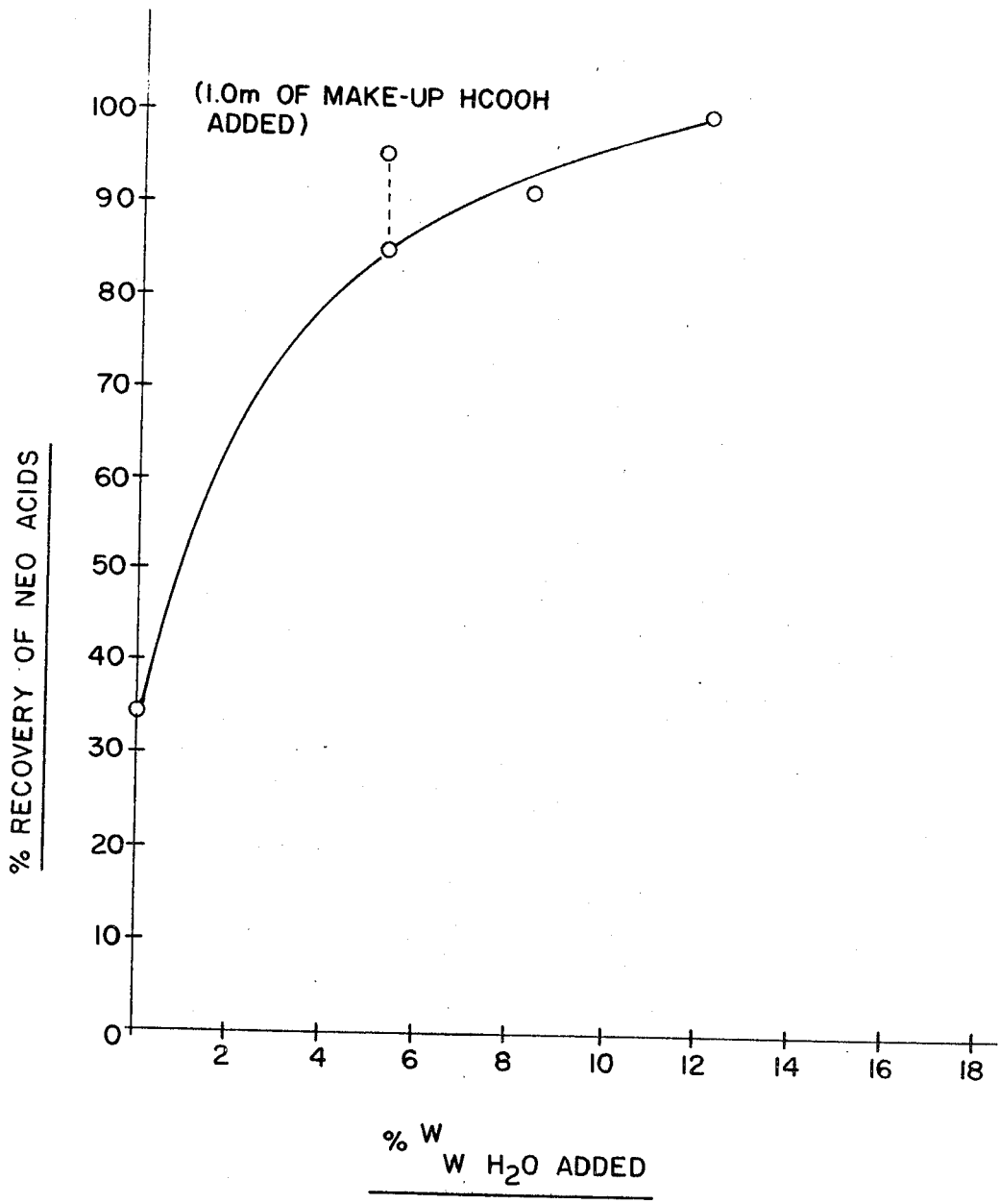

FIG. 3 shows the effect of the addition of water on the recovery of neo-decanoic acids. The reaction mixture comprised propylene trimer, formic acid and sulphuric acid in the ratio 1:2:6. It also shows the effect of the addition of 1 mole of formic acid with the water, showing improved recovery of neo-decanoic acids.

Figure 4:
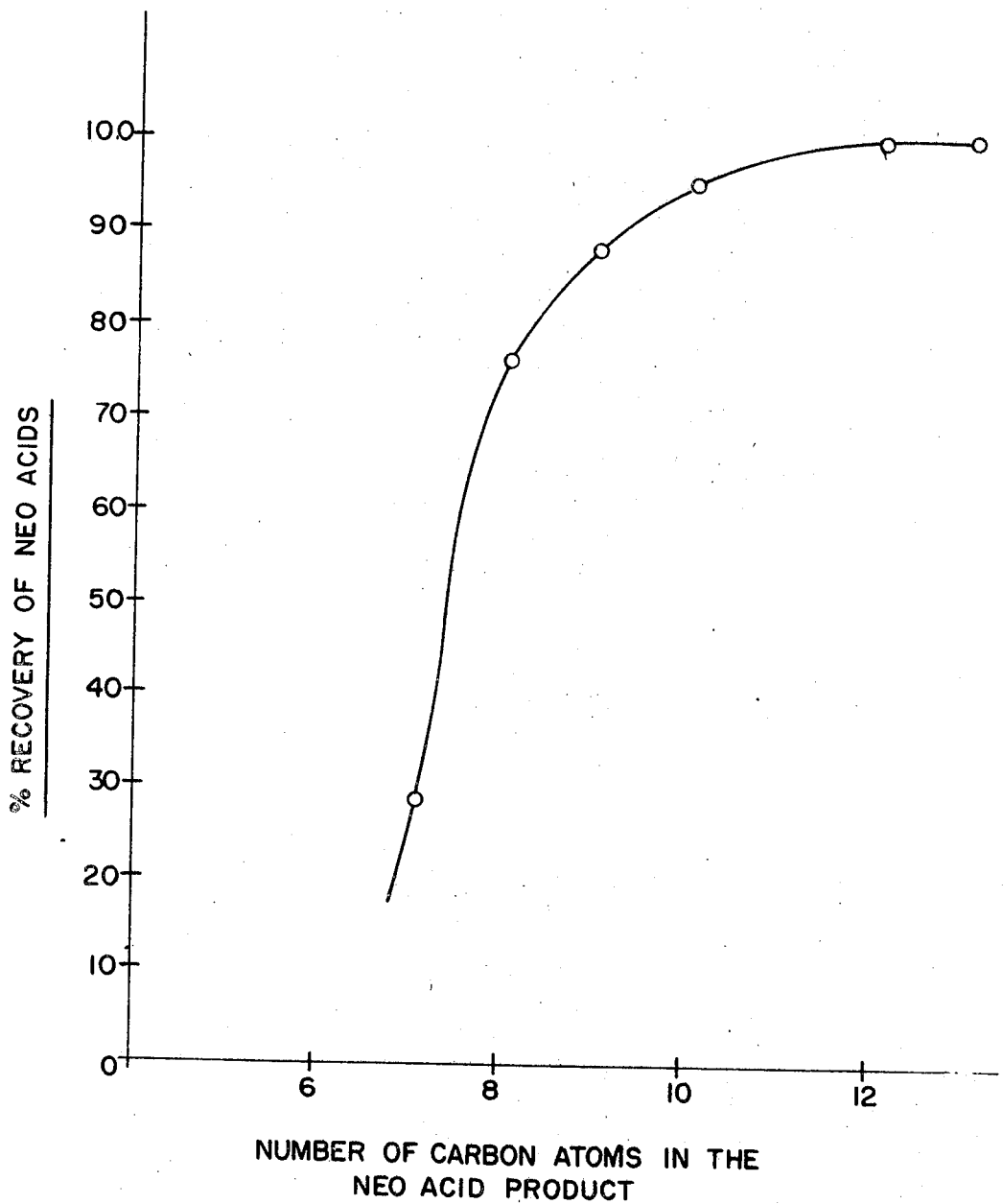

FIG. 4 shows the effect of variation of the molecular weight on the recovery of the neo-acids. The ratio of olefin to sulphuric acid was 1:6 and the separtion effected by the addition of 5% w./w. water and 1.0 mole formic acid.

TABLE 4

| | Percent conversion of olefin to— | | | | Overall yields of neo-acids on— | |
|---|---|---|---|---|---|---|
| | Neo-acids | | Sulphonic acids | | Olefin | Formic acid |
| | A | B | A | B | P. Trimer | |
| | P. Trimer | | | | | |
| Run No.: | | | | | | |
| 1 | 76.4 | 71.7 | 0.5 | 3.1 | 74.1 | 65.3 |
| 2 | 73.6 | 83.6 | 0.2 | 4.6 | 78.6 | 63.2 |
| 3 | 76.0 | 80.3 | 0.1 | 1.3 | 78.2 | 66.7 |
| | P. Tetramer | | | | P. Tetramer | |
| 4 | 73.7 | 69.7 | 1.9 | 5.5 | 71.7 | 63.2 |
| 5 | 78.3 | 68.4 | 0.3 | 6.1 | 73.4 | 61.0 |

EXAMPLE 8

The effects of olefin configuration on reaction rate and neo-acid yield are illustrated in Table 5.

EXAMPLE 10

Propylene trimer, formic acid and concentrated sulphuric acid were reacted under the conditions described in the previous examples and in the molar ratios given in Table 8. The neo-acids were separated by the addition of water and/or formic acid and isolated by extraction

TABLE 5

| | | Molar Ratio of Reagents used— | | | Reaction | | Percent Conversion to— | |
|---|---|---|---|---|---|---|---|---|
| | | Olefin | HCOOH | $H_2SO_4$ | Temp., °C. | Duration, (hours) | Neo-acids | Sulphonic acids |
| Run No.: | | | | | | | | |
| 1 | 3:3-dimethyl[1] butene-1 | 1 | 2 | 6 | 3°→12° | 1.75 | 92.8 | 0 |
| 2 | 4-methyl pentene-1 | 1 | 2 | 6 | 3°→10° | 1.8 | 83.2 | 0.19 |
| 3 | 3-methyl pentene-1 | 1 | 2 | 6 | 2°→15° | 1.7 | 84.5 | 0 |
| 4 | 4-methyl pentene-2 | 1 | 2 | 6 | 4°→14° | 1.7 | 80.0 | 0 |
| 5 | Cyclohexene | 1 | 2 | 6 | 2°→12° | 1.7 | 1.3 | 0 |
| 6 | Hexene-1 | 1 | 2 | 6 | 0°→8° | 1.7 | 11.4 | 0 |
| 7 | Hexene-2 | 1 | 2 | 6 | 2°→10° | 1.8 | 17.4 | 0 |
| 8 | 2:3-dimethyl butene 1 and 2 | 1 | 2 | 6 | 6°→16° | 2.0 | 91.0 | 0 |

[1] This olefin isomerised rapidly with acid catalyst to the tetra-substituted olefin tetramethyl ethylene and the neo-acid product was almost entrely 2:2:3-trimethyl butyric acid.

with cyclohexane. The results are given in Table 8 and clearly demonstrate the improved separation when water and formic acid are used.

TABLE 8

| Run No.: | Molar ratio of reagents used | | | Separation stage, moles added | | Percent recovery of neo-decanoic acids |
|---|---|---|---|---|---|---|
| | Propylene trimer | HCOOH | H₂SO₄ | H₂O | HCOOH | |
| 150 | 1 | 2 | 6 | 0 | 0 | 34 |
| 96 | 1 | 2 | 6 | 0 | 1.25 | 76 |
| 97 | 1 | 2 | 6 | 1.3 | 0 | 83 |
| S. 29 | 1 | 2 | 6.5 | 1.2 | 1 | 95 |

EXAMPLE 11

Formic acid (2 m.) was added under stirring and cooling to a 1 l. round bottom flask which contained 99% w./w. sulphuric acid (6 m.) at −10° C. over 20 minutes. A mixture of isoheptane (1 m.) cyclohexane (1 m.) and isobutylene (2 m.) were then added to the acid mixture over 1.2 h. at +3° to +20.5° C. The neo-acids produced (0.49 m. equiv.) were isolated from the reaction product as described in Example 2. G.L.C. analysis indicated that approximately equal amount of pivalic and neo-octanoic acids had been formed.

I claim:

1. In the process for the production of neo-carboxylic acids wherein formic acid in the presence of concentrated sulphuric acid is reacted with an olefin which is an acyclic or alicylic olefin, and wherein water is added to separate the organic phase from the reaction mixture and said neo-carboxylic acids are isolated from the organic phase, the improvement which comprises conducting the reaction with an olefin containing between 5 and 20 carbon atoms in the ratio between 1:1:2 and 1:4:12 of olefin:formic acid:sulphuric acid, adding water in amounts between 3 and 25% by weight of the sulphuric acid present in the mixture with water, whereby an organic phase separates, and isolating the neo-carboxylic acids therefrom by extraction.

2. The process according to claim 1 wherein the olefin is added to the mixture of formic and sulphuric acids in solution in a solvent which is an aliphatic chlorocarbon solvent or cyclohexane.

3. The process according to claim 1 wherein the reaction temperature lies within the range −20° C. to +30° C.

4. The process according to claim 1 wherein formic acid is added to the sulphuric acid at a temperature in the range 0° C. to −20° C., between 7 and 13% of the olefin is added with the formic acid and the remainder is added at a temperature in the range 0° C. to +20° C.

5. The process according to claim 1 wherein up to 3 moles of formic acid per mole of olefin reacted are added with the water to achieve phase separation.

6. A continuous process for the production of neo-carboxylic acids which comprises adding an acyclic or alicyclic olefin, containing between 8 and 20 carbon atoms in solution in an aliphatic chlorocarbon solvent to a mixture of formic and sulphuric acid, the concentration of sulphuric acid being 95–120% based on the free sulphur trioxide equivalent, at a temperature between 0° C. and +20° C., the ratio of olefin:formic acid:sulphuric acid being between 1:1.5:6 and 1:2:7, adding to the reaction mixture water in amount between 5 and 15% by weight of the mixture of sulphuric acid and water, whereby an organic phase separates, separating the organic phase and isolating the neo-carboxylic acids therefrom by extraction with the same aliphatic chlorocarbon solvent, flash evaporating the solvent and vacuum distilling the product, adding sulphur trioxide to the inorganic phase to regenerate sulphuric acid and recycling the regenerated sulphuric acid.

7. A continuous process for the production of neo-carboxylic acids which comprises adding an acyclic or alicyclic olefin, containing between 8 and 20 carbon atoms in solution in an aliphatic chlorocarbon solvent to a mixture of formic and sulphuric acids, the concentration of sulphuric acid being 95 to 120% based on the free sulphur trioxide equivalent, at a temperature in the range 0° C. to +20° C., the ratio of olefin:formic acid:sulphuric acid being between 1:1.5:6 and 1:2:7, adding to the reaction mixture water in an amount 5 to 15% by weight of the mixture of sulphuric acid and water and up to 2 moles of formic acid per mole of olefin, whereby an organic phase separates, separating the organic phase and isolating the neo-carboxylic acids therefrom by extraction with the same aliphatic chlorocarbon solvent, flash evaporating the solvent and vacuum distilling the product, adding sulphur trioxide to the inorganic phase to regenerate sulphuric acid and recycling the regenerated sulphuric acid containing the added formic acid.

References Cited

UNITED STATES PATENTS

| 1,896,287 | 2/1933 | Clark | 23—172 XR |
| 2,090,936 | 8/1937 | Clark | 23—172 XR |
| 2,345,506 | 3/1944 | Slotterbeck | 23—172 |
| 2,823,216 | 2/1958 | Moote et al. | 260—413 |
| 2,881,058 | 4/1959 | Atteridg | 23—172 XR |
| 2,940,914 | 6/1960 | Hoover | 204—154 |

OTHER REFERENCES

Koch et al., Ann. 618 (1958) pp. 251–266.

LEON ZITVER, Primary Examiner

H. T. MARS, Assistant Examiner

U.S. Cl. X.R.

260—514, 533